United States Patent
Tsuzaki et al.

(10) Patent No.: US 7,900,358 B2
(45) Date of Patent: Mar. 8, 2011

(54) METHOD OF MANUFACTURING ROLLING BEARING DEVICE FOR WHEEL

(75) Inventors: Youichi Tsuzaki, Kashiba (JP); Katsuyuki Harada, Yamatokoriyama (JP)

(73) Assignee: Jtekt Corporation, Osaka-shi, Osaka (JP)

( * ) Notice: Subject to any disclaimer, the term of this patent is extended or adjusted under 35 U.S.C. 154(b) by 1012 days.

(21) Appl. No.: 11/729,822

(22) Filed: Mar. 30, 2007

(65) Prior Publication Data

US 2007/0227004 A1 Oct. 4, 2007

(30) Foreign Application Priority Data

Mar. 31, 2006 (JP) ................ P2006-100034

(51) Int. Cl.
*B21D 39/00* (2006.01)
*B21D 53/00* (2006.01)
*B60B 27/00* (2006.01)
*F16C 35/00* (2006.01)

(52) U.S. Cl. ............... 29/898.07; 29/898; 29/898.04; 29/505; 29/507; 384/544; 384/589; 301/105.1

(58) Field of Classification Search ............ 29/505, 29/507, 513, 898, 898.04, 898.07; 301/105.1; 384/484, 544, 589

See application file for complete search history.

(56) References Cited

U.S. PATENT DOCUMENTS

| | | | | |
|---|---|---|---|---|
| 5,782,566 A | * | 7/1998 | Bertetti | 384/537 |
| 6,773,165 B2 | * | 8/2004 | Ozawa et al. | 384/544 |
| 2007/0217728 A1 | | 9/2007 | Kashiwagi et al. | |

FOREIGN PATENT DOCUMENTS

| | | |
|---|---|---|
| JP | 2001-246440 | 9/2001 |
| JP | 2002-301532 | 10/2002 |
| JP | 2002-339959 | 11/2002 |
| JP | 2005-177846 | 7/2005 |

OTHER PUBLICATIONS

Notification of Reason(s) for Refusal dated Nov. 2, 2010, with English translation.

* cited by examiner

*Primary Examiner* — David P Bryant
*Assistant Examiner* — Alexander P Taousakis
(74) *Attorney, Agent, or Firm* — McGinn IP Law Group, PLLC

(57) ABSTRACT

A method of manufacturing a double row rolling bearing device includes: providing a collet chuck having radially expandable separated parts and a tapered cone for radially expanding the separated parts; inserting the radially contracted collet chuck into a through hole before the double row rolling bearing is caulked to the hub shaft; caulking the cylindrical end of the hub shaft, with the separated parts being in contact with the end by radially expanding the collet chuck to prevent radially inward plastic deformation of the end; and contracting the collet chuck and extracting the collet chuck out of the hub shaft after the caulking.

5 Claims, 8 Drawing Sheets

METHOD OF MANUFACTURING ROLLING BEARING DEVICE FOR WHEEL

BACKGROUND OF THE INVENTION

The present invention relates to a method of manufacturing a rolling bearing device for a wheel, particularly a method of manufacturing a rolling bearing device for a wheel that rotatably supports a wheel to a suspension system of a vehicle.

In general, in rolling bearing devices for a wheel, a rolling bearing is mounted around the outer circumference of a hub shaft connected to a wheel through a flange at one axial end in such a manner that the bearing is prevented from being axially slipping off.

Such a hub shaft has a cylindrical end for retaining the rolling bearing at the other axial end (the right in FIG. 8). The cylindrical end is bent radially outward by an exclusive caulking jig and caulked as a caulked portion to the outer circumference of the inner ring of the rolling bearing. The rolling bearing does not slip off the hub shaft and receives pre-pressure by the caulked portion.

According to the caulking process, referring to FIG. 8A, when caulking load P is applied radially inward to a cylindrical end $1e$ of a hub shaft by a caulking jig, as shown in FIG. 8B, a caulked portion $1f$ is formed. Therefore, the end $1e$ of the hub shaft is made of steel, such as S55C, which is easy to apply plastic forming, to facilitate caulking process.

In a rolling bearing device for driving wheel of a vehicle, spline teeth $1c$ that are engaged with a shaft mounted at the outer ring of a constant velocity joint of a joint member are formed around the inner circumference of a through hole formed through the hub shaft.

According to the rolling bearing device for a wheel, as shown in FIG. 8B, large moment exerts in the cylindrical end of the hub shaft by the caulking load P generated in the caulking process, which may cause radially inward plastic deformation (radial contraction) of the through hole. When the radial-inward deformation of the through hole is large, the inner diameter of the spline teeth $1c$ (spline portion) is deformed and it is difficult to insert the shaft, so that it is required to apply broach process to the through hole of the hub shaft to adjust the dimensions, after the caulking process. It increases the number of processes and manufacturing cost. Further, because a clearance is formed between the end and the inner ring of the rolling bearing by the radially inward plastic deformation of the through hole, the bearing rigidity of the bearing device is deteriorated.

For this reason, to prevent plastic deformation of the end of the hub shaft, a method of caulking the end with a column-shaped metallic jig that is engaged with a portion of a region of the through hole corresponding to the region where the rolling bearing is mounted has been proposed (see JP-A-2002-301532).

According to the caulking method disclosed in JP-A-2002-301532, it has an effect on preventing inward plastic deformation of the through hole. However, since engaging with the through hole of the hub shaft is made by pressing the column-shaped jig, it is difficult to insert/extract the column-shaped jig into/out of the hub shaft before/after caulking process. Accordingly, the column-shaped jig may damage to the spline portion of the hub shaft.

SUMMARY OF THE INVENTION

The invention is made in the view of the problems, it is an object of the invention to provide a method of manufacturing a rolling bearing device for a wheel that has engaging portions for the outer ring of a constant velocity joint of a joint member are formed around the inner circumference of a hub shaft, which prevents radially inward plastic deformation of the hub shaft that is generated in caulking an end of the hub shaft to the rolling bearing by bending, without a damage to the engaging portions, and a rise in manufacturing cost for the bearing device.

In order to achieve the above-mentioned object, according to a first aspect of the invention, a method of manufacturing a rolling bearing device for a wheel in which a rolling bearing is disposed around an outer circumference of a hub shaft which includes a through hole axially formed therethrough and an engaging portion, formed around the inner circumference of the through hole, to be engaged with an outer ring of a joint member, and a cylindrical end of the hub shaft is caulked to a rolling bearing by bending the end radially outward, the method comprising:

preparing a collet chuck that includes a cylindrical portion and a plurality of separated portions formed by separating the cylindrical portion in an axial direction, the plurality of separated portions being radially expandable, and a diameter-changing portion for the collet chuck that radially expands and contracts the collet chuck;

inserting the collet chuck into the through hole of the hub shaft in a state that the collet chuck is radially contracted;

expanding the collet chuck so as to make the separated parts contact with the end;

caulking the end of the hub shaft in the state that the separated parts are in contact with the end to prevent radially inward plastic deformation of the end; and contracting the collet chuck and extracting the collet chuck out of the hub shaft after the caulking.

According to the configuration of the first aspect, when the end of the hub shaft is caulked to the rolling bearing, since the end of the hub shaft is supported from the inside (through hole) after the radially expandable and shrinkable collet chuck is radially expanded in the hub shaft, it is possible to prevent radially inward plastic deformation of the end. Therefore, other process, such as a broach process, is not needed after the caulking, and it is possible to save the number of processes and the manufacturing cost. A clearance is not formed between the inner ring of the rolling bearing and the end of the hub shaft after the caulking, so that the bearing rigidity of the hub shaft is not deteriorated. Further, according to the configuration of the first aspect, when the collet chuck is inserted into and extracted out of the hub shaft, it can be radially contracted in order not to contact with the engaging portion formed at the through hole. Therefore, it is possible to reduce effectively damage to the engaging portion of the through hole of the hub shaft due to the collet chuck.

According to a second aspect of the invention, in a method of manufacturing the rolling bearing of the first aspect, the separated parts of the collet chuck are urged toward each other, and a cavity in the cylindrical portion has a tapered surface that is tapered toward the free end, and the diameter-changing member includes a tapered member that has a tapered portion corresponding to the tapered surface, radially expands the separated parts by pushing the tapered surface with the tapered portion, and radially contracts the separated parts by retreating the tapered portion.

According to the configuration of the second aspect, the collet chuck in which the separated parts contact with the end of the hub shaft by expanding the collet chuck that is operable to radially expand and contract when the end of the hub shaft is caulked to the rolling bearing to prevent radially inward plastic deformation can be provided with a simple configuration.

According to a third aspect of the invention, in the method of manufacturing a rolling bearing device for a wheel of the first and second aspects, the outer circumference of the collet chuck has an engaging shape to be engaged with the engaging portion.

According to the configuration of a third aspect, when the collet chuck radially expands, since the engaging shape formed around the outer circumference of the collet chuck are engaged with the engaging portions around the inner circumference of the hub shaft, the contact areas of the collet chuck and the through hole the hub shaft can be increased as compared with when the engaging shape is not formed around the outer circumference of the collet chuck. In addition, since the collet chuck supports the through hole of the hub shaft at a plurality of dispersed positions, the facial contact pressure is decreased. Therefore, it can be possible to prevent effectively deformation of the engaging portion of the hub shaft generated when the hub shaft is supported by the collet chuck to prevent radially inward plastic deformation of the end of the hub shaft.

According to a fourth aspect of the invention, the method of manufacturing a rolling bearing device for a wheel of any one of the first to third aspect, the outer circumference of the collet chuck is positioned in parallel with the inner circumference of the hub shaft when the collet chuck is radially expanded.

According to the configuration of a fourth aspect, when the collet chuck radially expands, the outer circumference of the collet chuck is in parallel contact with the inner circumference of the through hole of the hub shaft. Therefore, the outer circumference of the collet chuck can contact with the inner circumference of the through hole of the hub shaft at the almost entire areas. Accordingly, for example, the contact areas between the collet chuck and the through hole of the hub shaft can be increased as compared with when the outer circumference of the collet chuck increases toward the end in expansion. In addition, since the collet chuck supports the through hole of the hub shaft at a plurality of dispersed positions, the facial contact pressure is decreased. Accordingly, it is possible to prevent effectively deformation of the engaging portion of the hub shaft that is generated when the collet chuck contacts with the hub shaft. When the configuration is combined with that of the third aspect, it is possible to prevent effectively deformation of the engaging portion of the hub shaft.

According to the invention, in a method of manufacturing a rolling bearing device for a wheel in which engaging portions that are engaged with the outer ring of a joint member, such as a constant velocity joint, are formed around the inner circumference of the hub shaft, it is possible to provide a method of manufacturing a rolling bearing device for a wheel that is operable to prevents radially inward plastic deformation of a hub shaft that is generated when an end of the hub shaft is caulked to the rolling bearing by bending, without damage to the engaging portions, and reduces rising cost of manufacturing the bearing device.

DETAILED DESCRIPTION OF PREFERRED EMBODIMENTS

First Embodiment

A first embodiment of the invention will be described hereafter with reference to accompanying drawings.

Figure 1:
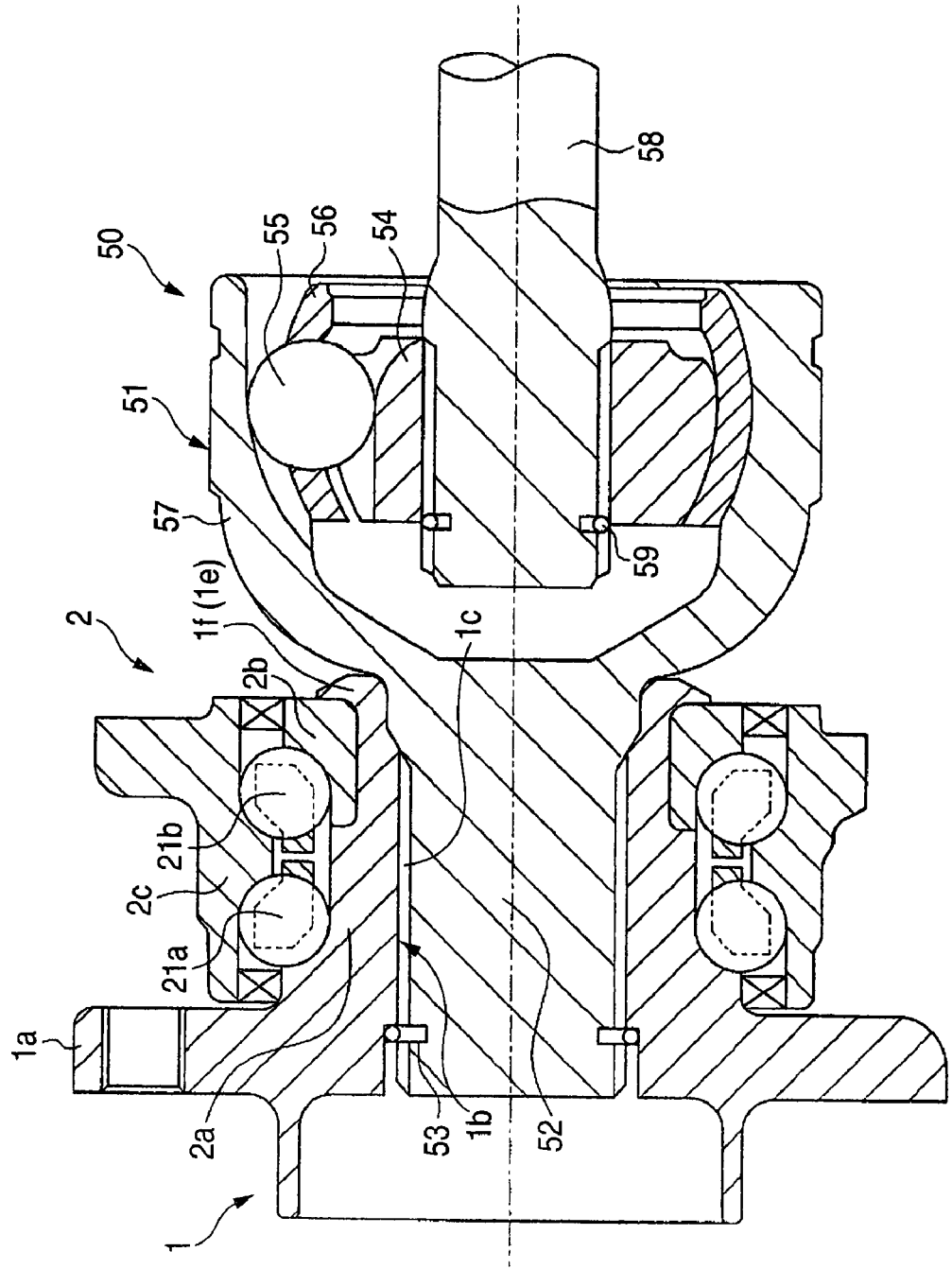
FIG. 1 is an axial cross-sectional view illustrating the configuration of a double row rolling bearing with a constant velocity joint assembled according to an embodiment of the invention.

As show in FIG. 1, a double row rolling bearing device (a rolling bearing device for a wheel) according to the present embodiment includes a hub shaft 1 that is connected to a wheel through a flange 1*a* formed around the outer circumference at a first axial end and a double row rolling bearing 2 that rotatably supports the hub shaft 1 to the suspension system of the vehicle body. The double row rolling bearing 2 includes a first inner ring 2*a* and a second inner ring 2*b* that are arranged at first and second axial ends (the left and right in FIG. 1), respectively, and an outer ring 2*c* that is disposed around the hub shaft 1, facing the inner rings 2*a*, 2*b*. In the double row rolling bearing 2 shown in FIG. 1, the first inner ring 2*a* is integrally formed with the hub shaft 1 and the second inner ring 2*b* is fixed to the outer circumference of the hub shaft 1, close to the second axial end of the first inner ring 2*a*. Balls 21*a*, 21*b* as rolling elements are rotatably arranged in a double row between the outer ring 2*c* and the inner rings 2*a*, 2*b*.

The double row rolling bearing device is used for the driving wheels of a vehicle and a through hole 1b is formed axially through the hub shaft 1. Spline teeth (engaging portions) 1c that are engaged in spline-fitting with a shaft 52 of an outer ring 51 of a constant velocity joint 50 (joint member) are formed around the inner circumference of the through hole 1b. A driving force for a vehicle is transmitted to the hub shaft 1 by rotation of the shaft 52. The constant velocity joint 50 shown in FIG. 1 is a common Rzeppa-type (bar-field type) constant velocity joint and includes the outer ring 51, an inner ring 54, balls 55, and a cage 56. The outer ring 51 includes a bowl-shaped portion 57 that accommodates the inner ring 54, balls 55, and cage 56 and the shaft 52 that is integrally connected to the top of the bowl-shaped portion 57. A spline is formed around the outer circumference of the shaft 52 and engaged in spline-fitting with the through hole 1b of the hub shaft 1. A shaft 58 is engaged in spline-fitting with the inner ring 54 of the constant velocity joint 50 and fixed by a stop ring 59 in order not to slip off. The shaft 58 is connected to the differential system of a vehicle through other constant velocity joint (not shown) at a second end. Further, the shaft 52 of the constant velocity joint 50 shown in FIG. 1 is fixed to the hub shaft by a stop ring 53 fixed to the through hole 1b in order not to slip off.

According to the double row rolling bearing 2, the end 1e of the cylindrical second axial end of the hub shaft 1 is bent radially outward and caulked to the second inner ring 2b of the double row rolling bearing 2. The caulked portion 1f presses the second inner ring 2b toward the first axial end, and applies predetermined pre-pressure to the double row rolling bearing 2 relative to the hub shaft 1 to fix the double row rolling bearing 2 without slipping off.

A method of assembling the double row rolling bearing device according to the present embodiment is characterized in a process of caulking the end 1e of the hub shaft 1 to the double row rolling bearing 2. A caulking process according to the present embodiment is now described below.

(Caulking Process for Double Row Rolling Bearing Device)

Figure 2A:
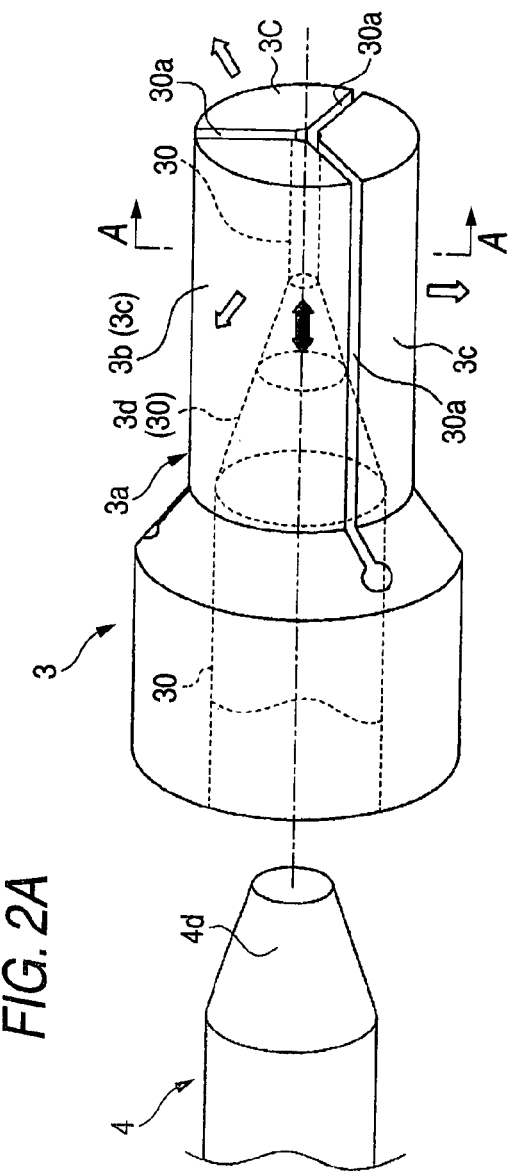
FIG. 2A is an exploded perspective view of main parts of a collet chuck body according to a first embodiment.

First, as shown in FIG. 2A, a collet chuck body is provided that includes a collet chuck 3 having a cylindrical portion 3a and a tapered cone 4 (a tapered member) that changes the diameter of the collet chuck 3 as inserted thereinto. The collet chuck body is operably mounted in advance in a caulking apparatus (not shown) and located at a first predetermined position (an initial position) where it is inserted into the hub shaft 1 that is located and held in the caulking apparatus.

The collet chuck 3 is formed of steel, such as carbon tool steel, that has undergone a heat treatment for appropriate elasticity. Further, a cylindrical portion 3a, the front portion 3b of the collet chuck 3, includes a plurality of (three) slits 30a extending radially outward from a cavity 30 formed in the collet chuck 3 and is circumferentially separated into a plurality of (three) parts at a regular interval (120°) by the slits 30a. The separated parts 3c are radially expandable and shrinkable. Referring to FIG. 2A, the separated parts 3c of the collet chuck 3 is urged toward each other by elasticity and form a substantial cylindrical shape in joining.

Figure 2B:
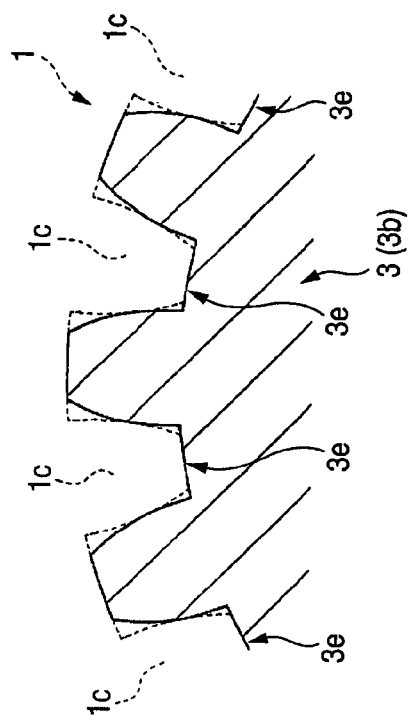
FIG. 2B is a partial cross-sectional view of the cylindrical portion of the collect chuck body, taken along the line A-A of FIG. 1.

As shown in FIG. 2A, the cavity 30 of the collet chuck 3 has a tapered surface 3d that is tapered (in a cone shape) toward the free end to a predetermined axial position and an inner cylindrical portion (reference numeral omitted) that is formed in a uniform diameter from the above axial position to the free end of the cylindrical portion 3a. The cavity 30 is also operable as a guiding path for the tapered cone 4 sliding inside axially. In the collet chuck 3, as shown in FIG. 2B, spline grooves 3e (for engaging) are formed around the outer circumference of the front portion 3b of the cylindrical portion 3a. The spline grooves 3e are engaged with the spline teeth 1c (shown in broken lines in FIG. 2B) formed around the inner circumference of the through hole 1b of the hub shaft 1, which will be described later. In detail, the spline grooves 3e around the outer circumference of the collet chuck 3 and the spline teeth 1c around the through hole 1b of the hub shaft 1 are configured such that their top lands and bottom lands, and side surfaces are in contact with each other, respectively, when the collet chuck 3 and the hub shaft 1 are engaged.

On the other hand, as shown in FIG. 2B, a tapered portion 4d is formed (in a cone shape) at the free end of the tapered cone 4, corresponding to the tapered surface 3d of the cavity 30 of the collet chuck 3.

According to the collet chuck body having the above configuration in the present embodiment, as the tapered portion 4d of the tapered cone 4 slides along the tapered surface 3d, the separated parts 3c of the collet chuck 3 moves radially outward and inward by elastic force. Accordingly, as the tapered cone 4 is guided inside the cavity 30 and moves from a first stop position to a second stop position, which are described later, relative to the collet chuck 3, the separated parts 3c of the collet chuck 3 move radially outward, as indicated by an arrow in FIG. 2a, such that they are separated away from each other. At the first stop position, the collet chuck 3 retracts, with the tapered surface 3d of the collet chuck 3 being in contact with the tapered portion 4d of the tapered cone 4. On the other hand, at the second stop position, the tapered portion 4d of the tapered cone 4 presses the tapered surface 3d of the collet chuck 3, the front portion 3b of the collet chuck 3 radially expands at a second predetermined position, which is described later, and the end 1e of the hub shaft 1 is supported from the inside (through hole 1b) by the separated parts 3c being in contact with the end 1e.

Figure 3:
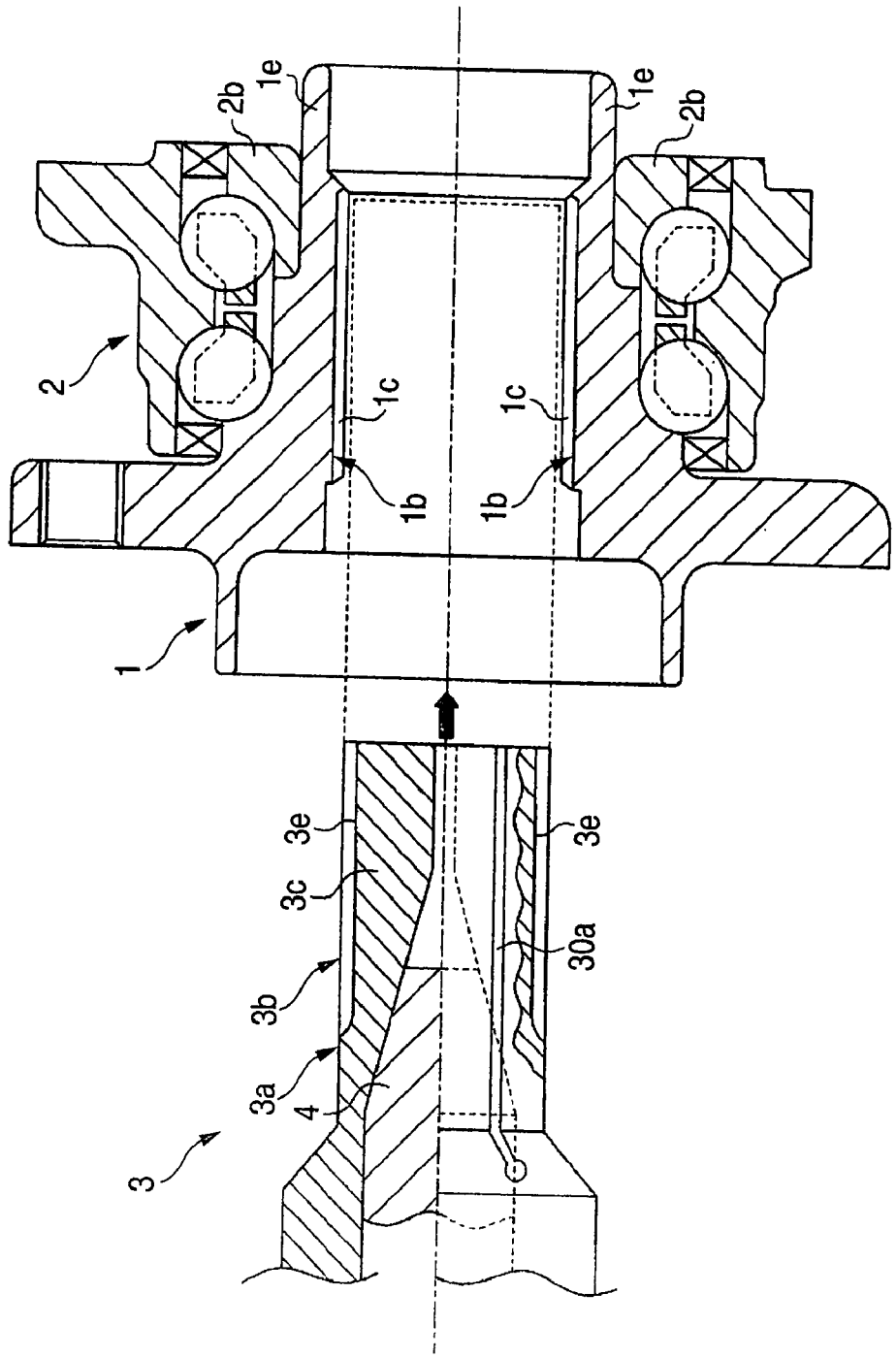
FIG. 3 is an axial cross-sectional view illustrating a collet chuck being inserted in a hub shaft in a process in a caulking process of the double row rolling bearing device according to the first embodiment of the invention.
Figure 4A:
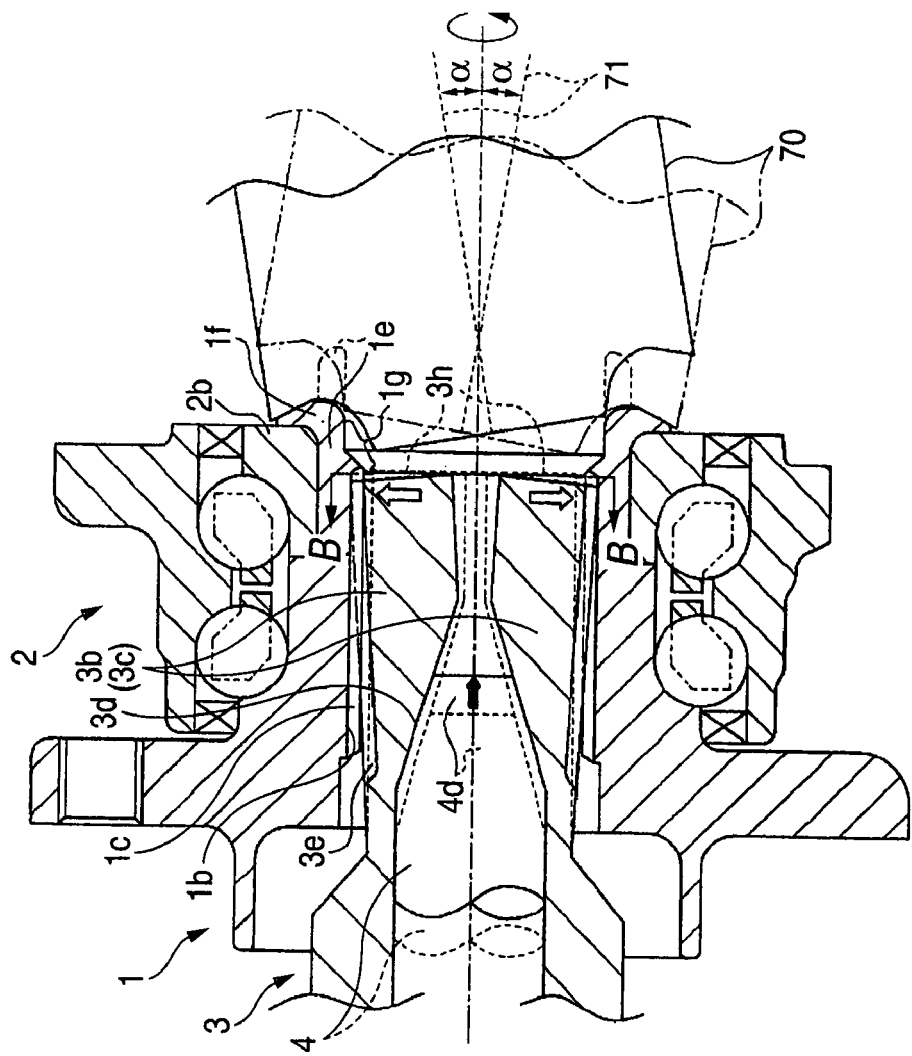
FIG. 4A is an axial cross-sectional view illustrating that the collet chuck inserted in a through hole of the hub shaft extends to support the hub shaft (through hole) from the inside in the caulking process, which is another process in the caulking process of the double row rolling bearing device according to the first embodiment of the invention.
Figure 4B:
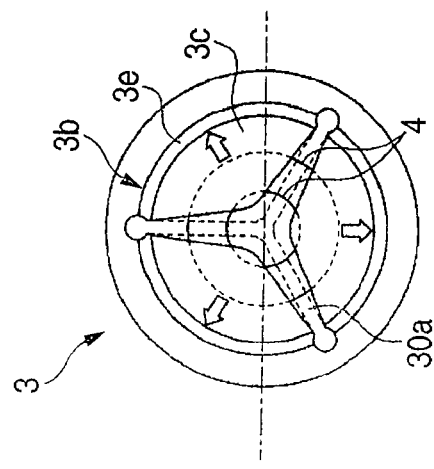
FIG. 4B is a cross-sectional view of FIG. 4A taken along the line B-B and seen from an arrow in FIG. 4A.
Figure 5:
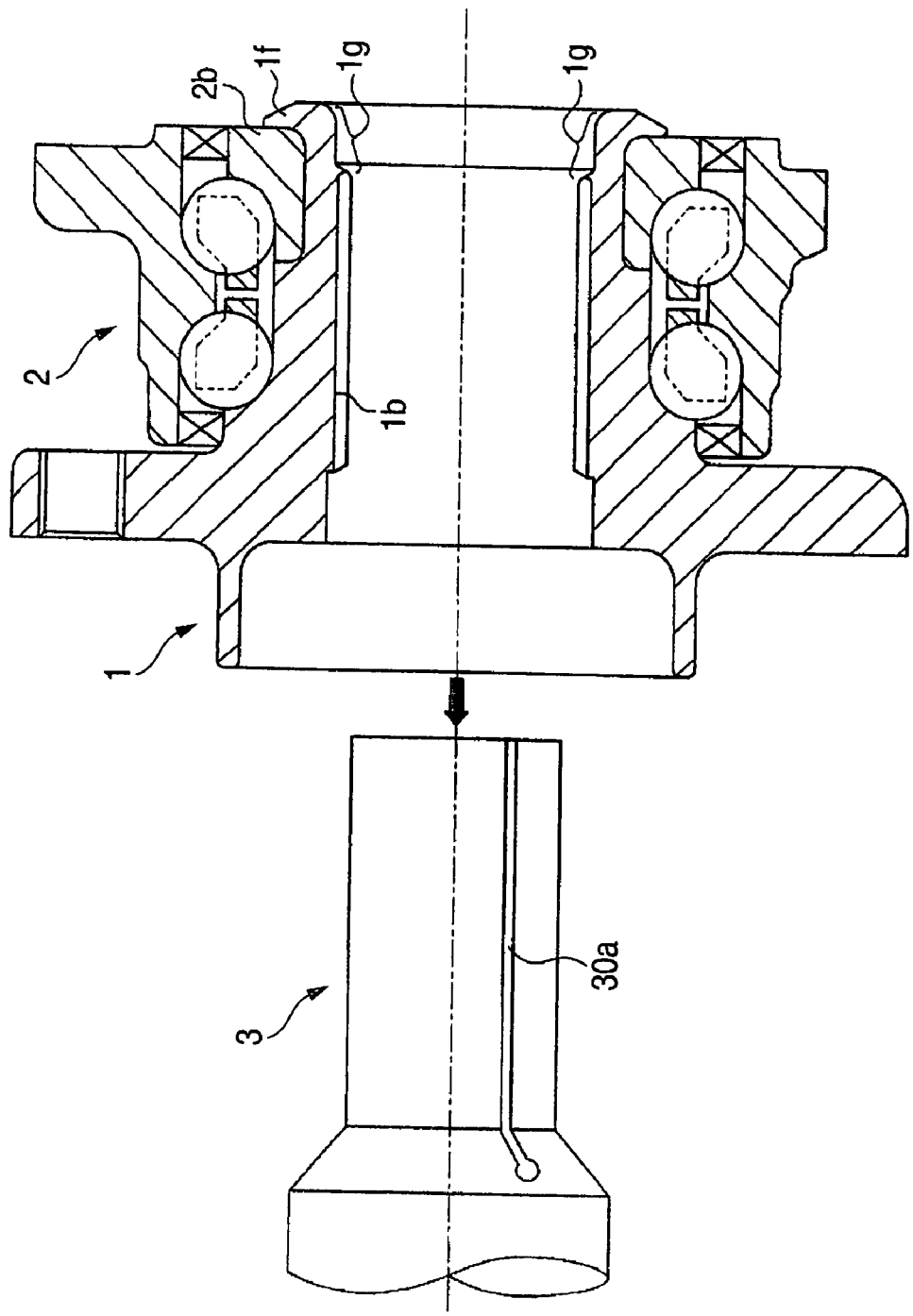
FIG. 5 is a cross-sectional view illustrating the collet chuck being extracted out of the hub shaft after the caulking process, which is another process in the caulking process of the double row rolling bearing device according to the first embodiment of the invention.

After the above preparation, in the order from FIG. 3 to FIG. 5, the cylindrical end 1e (axial end) of the axial second end (the right in FIG. 3) of the hub shaft 1 is caulked to the second inner ring 2b of the double row rolling bearing 2. The hub shaft 1 is held in a caulking apparatus (not shown), so that the double row rolling bearing 2 is temporarily mounted relative to the hub shaft 1 as shown in FIG. 3.

Before the caulking, as shown in FIG. 3, while the collet chuck 3 is radially contracted by the caulking apparatus, the collet chuck 3 (collet chuck body) is moved to the hub shaft 1 by a hydraulic mechanism equipped in the caulking apparatus and inserted into the through hole 1b of the hub shaft 1 to the second predetermined position (see FIG. 4A) (described later). When the front portion 3b of the collet chuck 3 is to be inserted into the through hole 1b of the hub shaft 1, the tapered cone 4, as shown in FIG. 3, stops at the first stop position. At the first stop position, the front portion 3b of the collet chuck 3 is pressed such that the separated parts 3c approach each other, and radially contracted. Continuing with FIG. 3, as described above, the spline grooves 3e are formed around the front portion 3b of the collet chuck 3 and engaged with the spline teeth 1c of the through hole 1b (see FIG. 2B).

As shown in FIG. 4A, the cylindrical end 1e of the hub shaft 1 is then bent radially outward through an oscillating caulking process by a caulking jig 70 equipped in the caulking apparatus. That is, as described above, before the oscillating caulking process, while the collet chuck 3 is radially contracted, collet chuck 3 is inserted into the through hole 1b of the hub shaft 1 and stopped at the predetermined second position shown in a broken line in FIG. 4A (where the axial center of the collet chuck 3 agrees with that of the hub shaft 1 and the free end 3h of the front portion 3b almost reaches a diameter expanding portion 1g formed at the axial second end (the right in FIG. 4A) of the through hole 1b).

Figure 8A:
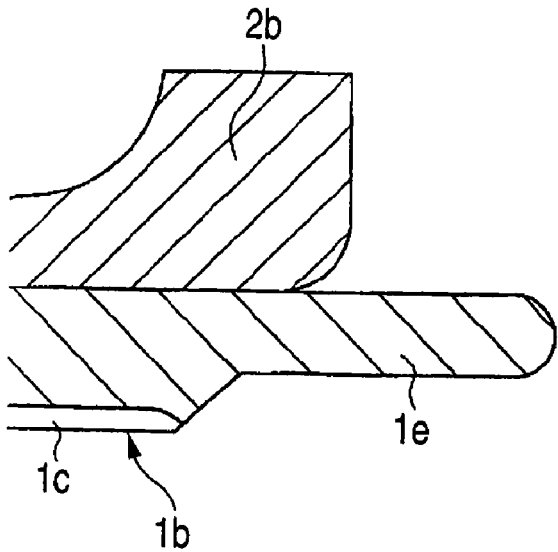
FIG. 8A is a view illustrating a caulking process for the end (axial end) of a second axial end of a hub shaft, in which the end is not caulked yet.
Figure 8B:
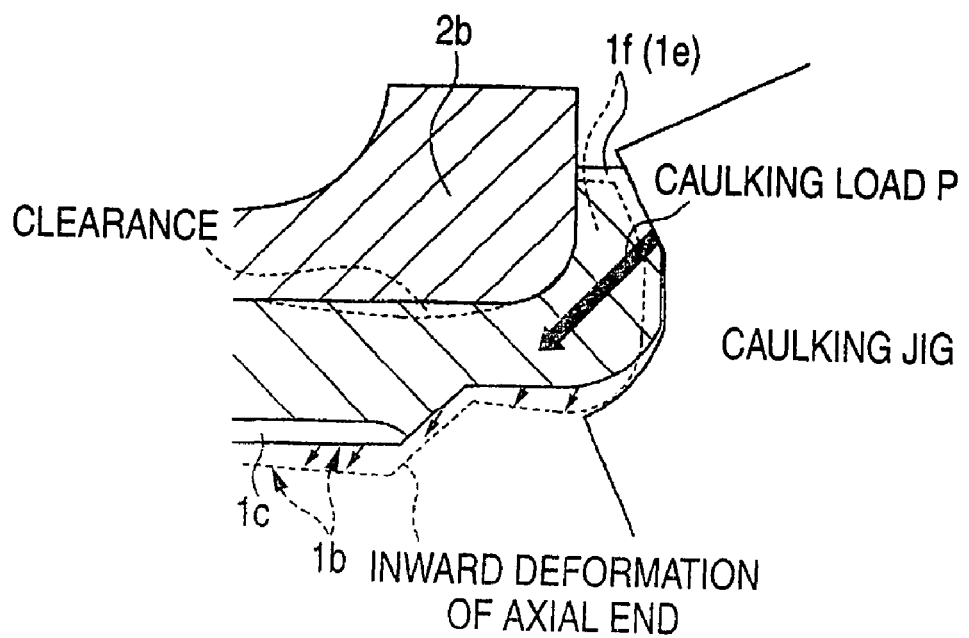
FIG. 8B is a view of the end after the caulking process.

After the collet chuck 3 is located as described above, the tapered cone 4 is guided into the cavity 30 of the collet chuck 3. While the tapered cone 4 slides from the first stop position (where the tapered cone 4 is shown in a broken line in FIG. 4A) to the second stop position (where the tapered cone 4 is shown in a solid line), the tapered cone 4 presses the tapered surface 3d with the tapered portion 4d. Accordingly, as shown by radial-outward arrows in FIG. 4B, the collet chuck 3 radially expands, and the outer circumference of the front portion 3b of the collet chuck 3 contacts with the inner circumference of the through hole 1b of the hub shaft 1 as shown in a solid line (cross-section) in FIG. 4A. By maintaining the outer circumference of the front portion 3b of the collet chuck 3 being in contact with the inner circumference of the through hole 1b of the hub shaft 1, plastic deformation at the end 1e due to load by the caulking load P (see FIG. 8B) is prevented. In FIG. 4A, when the front portion 3b of the collet chuck 3 contacts with the end 1e of the hub shaft 1 by radially expanding, the spline grooves 3e of the collet chuck 3 are engaged with the spline teeth 1c of the through hole 1b (see FIG. 2B).

According to the present embodiment, as the collet chuck 3 radially expands, the outer circumferences of the collet chuck 3 and the through hole 1b of the hub shaft 1 are in contact through not only the top lands and bottom lands of the spline grooves 3e and the spline teeth 1c but also the side surfaces. Therefore, the contact areas of the collet chuck 3 and the hub shaft 1 increases as compared with when the outer circumference of the collet chuck 3 is formed in a column shape, not the spline shape. In addition, the contact surface pressure decreases, because the end 1e of the hub shaft 1 is supported at a plurality of positions by the three separating parts of the collet chuck 3. Accordingly, in caulking the end 1e of the hub shaft 1, when the end 1e of the hub shaft 1 is supported by the collet chuck 3, it can be possible to prevent effectively deformation caused by pressing the end 1e (caulked portion 1f) between the caulking jig 70 and the collet chuck 3, at the spline portion of the hub shaft 1. Further, it may be possible to prevent the difficulty of extracting the collet chuck 3 due to the spline teeth 1c of the hub shaft 1 stuck in the collet chuck 3 and further it is possible to prevent that the spline teeth 1c is crushed by press-contact of the collet chuck 3.

In the above condition, as shown in FIG. 4A, the caulking jig 70 is applied in inclined position at a predetermined angle α to the end 1e of the hub shaft 1 and then rocked and rotated by rotating a rotary shaft 71. Accordingly, the end 1e of the hub shaft 1 is gradually bent radially outward and the bent portion (caulked portion 1f) is pressed onto the end at the axial second end of the second inner ring 2b. As the caulking is applied, the above-mentioned caulking load P is applied to the hub shaft 1 at the end 1e (see FIG. 8B), but the end 1e of the hub shaft 1 is supported from the inside (the through hole 1b) by the separated parts 3c of the collet chuck 3, as described above. Therefore, radially inward plastic deformation (radial contraction) at the end 1e due to the caulking load P is effectively prevented.

As described above, referring to FIG. 5, the bent portion (caulked portion 1f) of the end 1e of the hub shaft 1 is caulked to the end of the second inner ring 2b of the double row rolling bearing 2. Accordingly, while predetermined pre-pressure is applied to the double row rolling bearing 2, the double row rolling bearing 2 is fixed to the hub shaft 1.

After the caulking is completed, as shown in FIG. 5, the collet chuck 3 is extracted out of the through hole 1b of the hub shaft 1 and retreated to the predetermined first position.

According to the above method of manufacturing a double row rolling bearing of the present embodiment, the following operational effects are achieved.

(1) According to the present embodiment, in the caulking process of the end 1e of the hub shaft 1 in the double row rolling bearing device, after the collet chuck 3 that is operable to radially expand and contract is inserted in the through hole 1b of the hub shaft 1, when the cylindrical end 1e of the hub shaft 1 is caulked, the end 1e of the hub shaft 1 is supported from the inside (through hole 1b). Therefore, it is ensured that the end 1e of the hub shaft 1 does not undergo radially inward plastic deformation due to the caulking load P generated in the caulking process. Accordingly, after the caulking process, for example, it is not needed to apply a broach process to adjust the through hole 1b of the hub shaft 1 in a predetermined dimension, which prevents the manufacturing cost from rising due to increase in the number of processes. Further, since the end 1e of the hub shaft 1 is supported from the inside by the collet chuck 3 in the caulking process of the end 1e of the hub shaft 1, a clearance is not formed between the second inner ring 2b and the end 1e of the hub shaft 1 after the caulking process and it prevents the hub shaft 1 from decreasing in bearing rigidity.

(2) According to the present embodiment, the collet chuck 3 is inserted into and extracted out of the through hole 1b of the hub shaft 1 by radially contracting before/after the caulking process. Therefore, the collet chuck 3 does not damage the spline teeth 1c of the hub shaft 1 by contact and the caulking process is applied with safety, and good quality is achieved for completed bearing device.

(3) According to the present embodiment, when the collet chuck 3 that is expanded in diameter and contacted with the through hole 1b of the hub shaft 1, the spline grooves 3e around the outer circumference of the collet chuck 3 are engaged with the spline teeth 1c around the inner circumference of the through hole 1b. Therefore, since the spline grooves 3e and the spline teeth 1c are in contact at not only the top lands and the bottom lands but also the side surfaces, the contact areas of the collet chuck 3 and the hub shaft 1 are increased as compared when spline is not formed around the outer circumference of the collet chuck 3. In addition, since the end 1e of the hub shaft 1 is supported at a plurality of positions by the three separating parts of the collet chuck 3, the contact surface pressure is decreased. Accordingly, it is possible to prevent effectively the spline of the hub shaft 1 from deforming when caulking the end 1e of the hub shaft 1 supported by the collet chuck 3. Since the spline teeth 1c is inserted in corresponding spline grooves 3e when the collet chuck 3 radially expands, damage to the spline teeth 1c is effectively prevented in the case that, for example, the spline teeth 1c are formed in an acute angle that is easier to be damaged.

Second Embodiment

A second embodiment is described hereafter by way of a detailed example for the invention, with reference to the accompanying drawings. A method of manufacturing a double row rolling bearing according to the present invention has the same configuration as the first embodiment, except that the collet chuck and the tapered cone are provided with other components different from the first embodiment. Therefore, the same components as in the first embodiment are denoted by the same reference numerals and not described in the present embodiment. Caulking process according to the present embodiment is now described below.

(Caulking Process of Double Row Rolling Bearing)

Figure 6A:
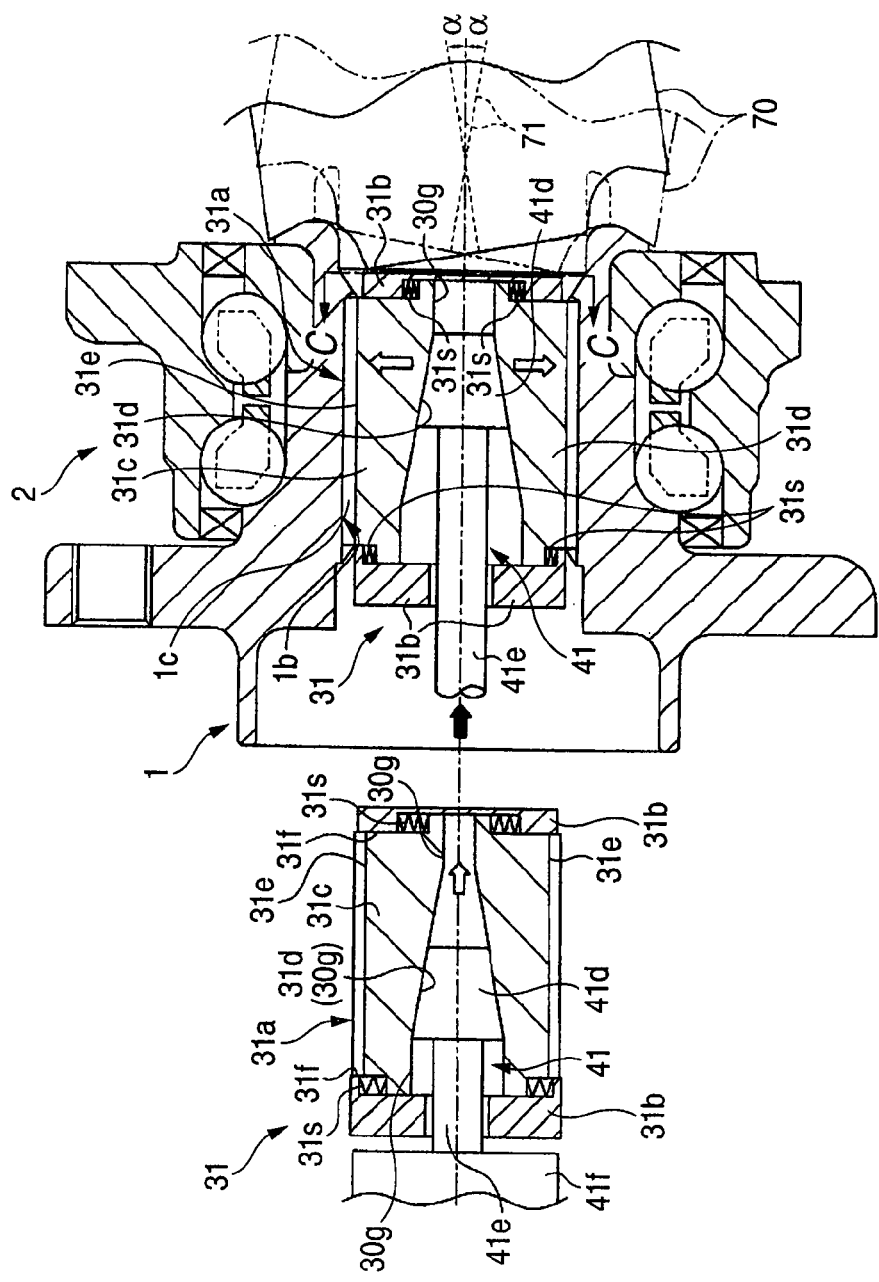
FIG. 6A is a view illustrating the collet chuck body before inserted in the through hole of the hub shaft and after inserted in the through hole of the hub shaft and radially expands to support the hub shaft from the inside (through hole), in a caulking process of a double row rolling bearing device and main parts of the collet chuck according to a second embodiment of the invention.

First, as shown in FIG. 6A, a collet chuck body is provided that includes a collet chuck 31 having a cylindrical portion 31a and a tapered cone 41 (a tapered member) that is inserted in the collet chuck 31 and changes the diameter of the collet chuck 31. The collet chuck body is operably mounted in advance in a caulking apparatus (not shown) and located at a first predetermined position (an initial position) where it is operable to be inserted into the hub shaft 1 that is located and held in the caulking apparatus.

Figure 6B:
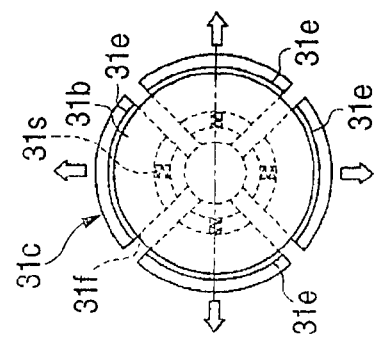
FIG. 6B is a cross-sectional view of the collet chuck taken along the line C-C and seen from an arrow.

The collet chuck 31, as shown in FIGS. 6A and 6B, includes a plurality of (four) separated parts 31c that are formed by dividing a column at regular angles of 90° and a cylindrical housing 31b that retains the separated parts 31c joined in a column shape such that they are radially expandable and shrinkable. The cylindrical housing 31b is provided with a plurality of openings 31f, which are formed in rectangular shape when seen from a plan view, at a plurality of (four positions) around the outer circumference of the housing 31b, the openings 31f corresponding to the shape of each separated parts 31c. Further, the separated parts 31c are urged (radially inward) toward each other by springs 31s between the separated parts 31c and the housing 31b. As shown in FIGS. 6A and 6B, springs 31s are disposed at the centers of ends of the separated parts 31, respectively, that is, eight springs 31s are arranged at regular angles of 90°.

As shown in FIG. 6A, the cavity 30g defined by the separated parts 31c includes a tapered surface 31d that is tapered toward the free end to a predetermined axial position and an inner cylindrical portion (reference numeral omitted) that is formed in a uniform diameter from the above axial position to the free end of the cylindrical portion 3a. The cavity 30g is operable as a guiding path for the tapered cone 41 sliding inside axially. In the collet chuck 31, similar to the collet chuck 3 of the first embodiment, spline grooves 31e that are to be engaged with spline teeth 1c of a through hole 1b of the hub shaft 1 are formed around the outer circumference of the cylindrical portion 31a (each of the separated parts 31c).

On the other hand, as shown in FIG. 6A, the tapered cone 41 is formed with a tapered portion 41d corresponding to the tapered surface 31d of the collet chuck 31 at the end and a shaft 41e connected to the tapered portion 41d. The shaft 41e is also connected to a cylinder 41f and operable to reciprocate by a hydraulic mechanism.

In the collet chuck body according to the present embodiment having the above configuration, as the tapered portion 41d of the tapered cone 41 slides along the tapered surface 31d, the springs 31s at both ends extend/retract and each of the separated parts 31c of the collet chuck 31 reciprocates perpendicular to the axial direction of the collet chuck 31 through corresponding openings 31f. Accordingly, as the tapered cone 41 is guided inside the cavity 30g and moves from a first stop position to a second stop position, which are described later, relative to the collet chuck 31, the separated parts 31c move radially outward, as indicated by an arrow in FIGS. 6A and 6B, such that they are separated away from each other while expanding radially uniformly throughout the length. At the first stop position, the collet chuck 31 radially contracts, with the tapered surface 31d being in contacting with the tapered portion 41d of the tapered cone 41. On the other hand, at the second stop position, the tapered portion 41d of the tapered cone 41 presses the tapered surface 31d of the collet chuck 31, the collet chuck 3 radially expands at a second predetermined position, and the end 1e of the hub shaft 1 is supported from the inside (through hole 1b) by the separated parts 31c being in contact with the end 1e.

After the above preparation, in the same order as in the first embodiment, the cylindrical end 1e (axial end) of the axial second end of the hub shaft 1 is caulked to the second inner ring 2b of the double row rolling bearing 2. That is, as shown in FIG. 6A, the caulking jig 70 is applied in inclined position at a predetermined angle α to the end 1e of the hub shaft 1 and then rocked and rotated by rotating a rotary shaft 71. Accordingly, the end 1e is bent radially outward. In the caulking process, since the tapered portion 41d of the tapered cone 41 presses the tapered surface 31d of the collet chuck 31, the collet chuck 31 radially expands and the end 1e is supported from the inside (through hole 1b) by the separated parts 31c being in contact with the end 1e of the hub shaft 1. According to the present embodiment, as shown in FIGS. 6A and 6B, each of the separated part 31c moves perpendicular to the axial direction of the collet chuck 31 and the cylindrical portion 31a (separated parts 31c) expands radially uniformly throughout the length. Therefore, when the collet chuck 31 radially expands, the outer circumference of the cylindrical portion 31a (separated parts 31c) is in parallel contact with the inner circumference of the through hole 1b of the hub shaft 1.

According to the method of manufacturing the double row rolling bearing of the present embodiment, the following operational effects are achieved, in addition to the operational effects from the method of the first embodiment. Each of the separated parts 31c of the collet chuck 31 reciprocates perpendicular to the axial direction of the collet chuck 31 by the extension/retraction of the springs 31s at both ends according to the sliding of the tapered cone 41. Accordingly, while the collet chuck 31 (separated parts 31c) radially expands, the outer circumference contacts in parallel with the inner circumference of the through hole 1b of the hub shaft 1. Therefore, the collet chuck 31 is in facial contact with the through hole 1b at the side surfaces as well as the entire region of the outer circumference where the spline grooves 31e exist through the bottom lands of the spline grooves 31e and the top lands of the spline teeth 1c of the hub shaft 1. Accordingly, the contact areas of the collet chuck 31 and the through hole 1b of the hub shaft 1 are increased as compared with when the outer circumference of the collet chuck 3 increases toward the end. Further, the collet chuck 3 supports the through hole 1b of the hub shaft 1 at more wide region, and the contact pressure is attenuated effectively. Therefore, it is possible to prevent effectively the spline portion of the hub shaft 1 from deforming when the collet chuck 3 contacts with the hub shaft 1 to prevent radially inward plastic deformation of the end 1e of the hub shaft 1. The above embodiments may be modified as follows.

According to the first embodiment, the outer circumference of the collet chuck 3 is formed in a column shape in radial contraction and increases toward the end in expansion of the collet chuck 3, but it is not limited thereto, the outer circumference of the collet chuck 3 may be tapered to an axial middle point of the front portion 3b and, in expansion of the collet chuck 3, the outer circumference of the separated parts 3c contacts parallel with the inner circumference of the through hole 1b of the hub shaft 1. Accordingly, the spline grooves 3e of the collet chuck 3 and the spline teeth 1c of the hub shaft are in contact at the bottom lands and the top lands, so that the contact areas of them are increased as compared to the first embodiment. Further, the collet chuck 3 supports the through hole 1b of the hub shaft 1 through more wide region, so that the contact pressure is attenuated effectively. Therefore, when the collet chuck 3 supports the end 1e to prevent radially inward plastic deformation of the end 1e of the hub shaft 1, it is possible to prevent effectively the spline portion of the hub shaft 1 from deforming.

According to the above embodiments, the spline grooves 3e (31e) that are engaged with the spline teeth 1c around the inner circumference of the hub shaft 1 are formed around the outer circumference of the collet chuck 3 (31). However, it is not limited thereto, for example, when serration teeth that are engaged with the outer ring of a joint member are formed around the inner circumference of the hub shaft 1, serration grooves may be formed that are engaged with the serration teeth, around the collet chuck 3 (31). That is, the engaging shape and engaging portions formed at the collet chuck 3 and the through hole 1b of the hub shaft 1 are not limited to the spline, as long as the contact areas of them is ensured in order not to deform the spline portion of the through hole 1b of the hub shaft 1 and the hub shaft 1 is supported uniformly from the inside when the collet chuck 3 (31) supports the end 1e of the hub shaft 1 from the inside (through hole 1b) through expansion.

Figure 7A:
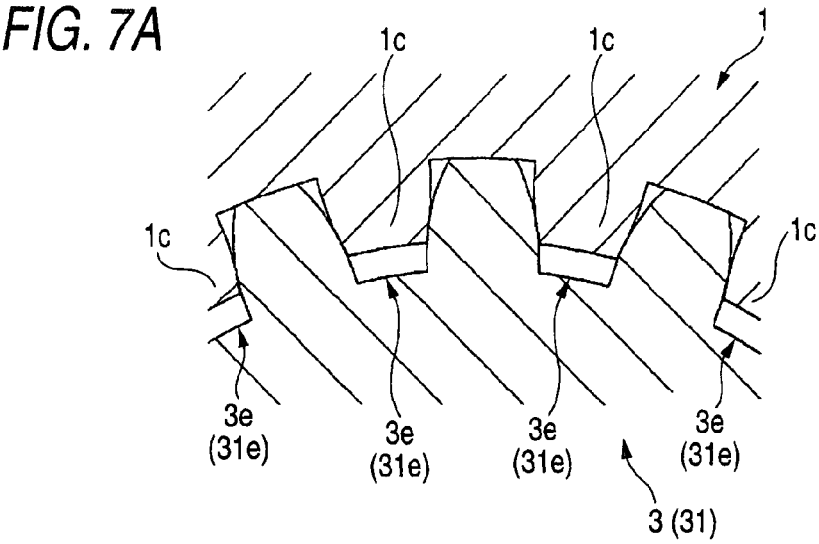
FIG. 7A is a circumferential partial cross-sectional view of the hub shaft with the collet chuck in contact in the caulking process of the double row rolling bearing according to the embodiment of the invention, in which the collet chuck and the hub shaft are engaged with each spline.
Figure 7B:
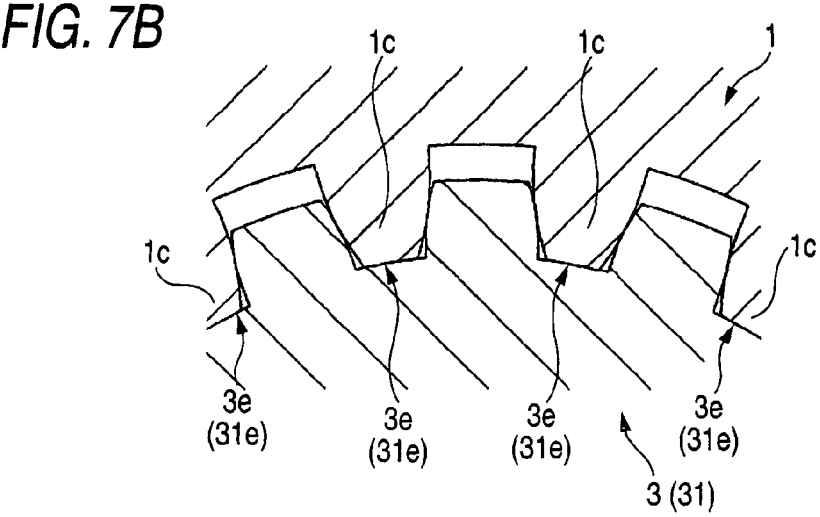
FIG. 7B is a circumferential partial cross-sectional view illustrating another engagement in FIG. 7A.

According to the above embodiments, the spline grooves 3e (31e) around the outer circumference of the collet chuck 3 (31) and the spline teeth 1c of the through hole 1b of the hub shaft 1 are formed to be in contact at the bottom lands, top lands, and side surfaces (see FIG. 2b). However, it is not limited thereto, it may be sufficient that the hub shaft 1 is uniformly supported from the inside with the contact areas ensured, in order not to deform the spline portion of the through hole 1b of the hub shaft 1 when the collet chuck 3 (31) supports the hub shaft 1 from the inside (through hole 1b) in expansion. For example, as shown in FIG. 7A, it may be possible that the spline grooves 3e (31e) of the collet chuck 3 (31) are formed in a depth larger than the spline teeth 1c of the hub shaft 1 and the spline teeth 1c does not contact with the bottom lands of the spline grooves 3e (31e). In other words, it may be constituted that the spline teeth 1c and the spline grooves 3e (31e) are in contact only at the side surfaces, the bottom lands of the spline grooves formed between the spline teeth 1c, and the top lands of the spline teeth formed between the spline grooves 3e (31e). Further, as shown in FIG. 7B for example, it may be preferable that the spline grooves 3e (31e) of the collet chuck 3 (31) are formed in a depth smaller than the spline teeth 1c of the hub shaft 1 and they are in contact at the bottom lands of the spline grooves formed between the spline teeth 1c and the top lands of the spline teeth formed between the spline grooves 3e (31e). In other words, the spline teeth 1c and the spline grooves 3e (31e) may be in contact at only the side surfaces of the spline teeth 1c and the spline groove 3e (31e), and at the top lands of the spline teeth 1c, and the bottom lands of the spline grooves 3e (31e).

Figure 7C:
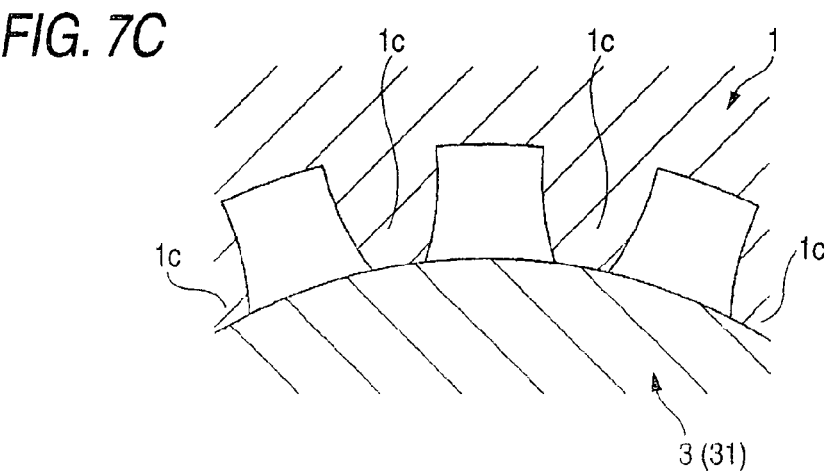
FIG. 7C is a partial cross-sectional view illustrating engagement of a hub shaft with splines and a collet chuck without a spline.

According to the above embodiments, the outer circumference of the collet chuck 3 (31) may be formed in a column shape without the engaging shape that is engaged with the through hole 1c, such as a spline shape or serration shape, as shown in FIG. 7c, as long as the contact areas of the collet chuck 3 (31) and the through hole 1b of the hub shaft 1 is acceptably ensured and the facial contact pressure between them is reduced.

What is claimed is:

1. A method of manufacturing a rolling bearing device for a wheel in which a rolling bearing is disposed around an outer circumference of a hub shaft which includes a through hole axially formed therethrough and an engaging portion, formed around an inner circumference of the through hole, to be engaged with an outer ring of a joint member, and a cylindrical end of the hub shaft is caulked to a rolling bearing by bending the end radially outward, the method comprising:

preparing a collet chuck that includes a cylindrical portion and a plurality of separated portions formed by separating the cylindrical portion in an axial direction, the plurality of separated portions being radially expandable and shrinkable, and a diameter-changing portion for the collet chuck that radially expands and contracts the collet chuck;

inserting the collet chuck into the through hole of the hub shaft in a state that the collet chuck is radially contracted;

radially expanding the collet chuck so as to make the separated parts contact with the end;

caulking the end of the hub shaft in the state that the separated parts are in contact with the end to prevent radially inward plastic deformation of the end; and radially contracting the collet chuck and extracting the collet chuck out of the hub shaft after the caulking.

2. The method according to claim 1, wherein the separated parts are urged so as to approach each other during the radially contracting of the collet chuck, and a cavity in the cylindrical portion has a tapered surface that is tapered toward a free end thereof, and the diameter-changing portion includes a tapered member that has a tapered portion corresponding to the tapered surface, radially expands the separated parts by pushing the tapered surface with the tapered portion, and radially contracts the separated parts by retreating the tapered portion.

3. The method according to claim 1, wherein the outer circumference of the collet chuck has an engaging shape to be engaged with the engaging portion.

4. The method according to claim 3, wherein the outer circumference of the collet chuck is positioned in parallel with the inner circumference of the hub shaft when the collet chuck is radially expanded.

5. The method according to claim 1, wherein the outer circumference of the collet chuck is positioned in parallel with the inner circumference of the hub shaft when the collet chuck is radially expanded.

* * * * *